3,310,610
FLUOROTOLUENE-DITHIOL-PHOSPHORODITHIOATE

Donald W. Stoutamire, Modesto, Calif., assignor to Shell Oil Company, New York, N.Y., a corporation of Delaware
No Drawing. Filed May 18, 1964, Ser. No. 368,363
1 Claim. (Cl. 260—930)

This invention relates to a novel organophosphorus compound which has been found to be effective for the control of mites and insects.

It thas been found that 4-fluorotoluene-alpha,alpha-dithiol bis(O,O-dimethyl phosphorodithioate), represented by the formula:

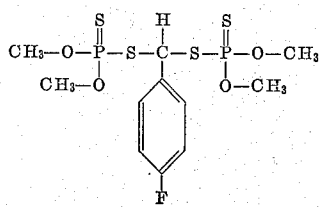

is highly toxic to mites and insects, but is not phytotoxic, so that it can be used to control mites and insects feeding upon plants. Furthermore, this compound has been found to possess a very low order of toxicity with respect to mammals. In fact, this compound has been found to have an unexpectedly low mammalian toxicity, for it has been found to be markedly less toxic to mice than structurally similar compounds. As is shown in the following table, structurally similar compounds have an acute oral toxicity, male mice $LD_{50}$ (mg./kg.) of about 40 to 175; thus:

| Compound— | Toxicity, acute oral, male mice, $LD_{50}$ mg./kg. |
|---|---|
| 4-fluorotoluene-alpha,alpha-dithiol bis(O,O-dimethyl phosphorodithioate) | >1000 |
| 3-fluorotoluene-alpha,alpha-dithiol bis(O,O-dimethyl phosphorodithioate) | 176 |
| 2-fluorotoluene-alpha,alpha-dithiol bis(O,O-dimethyl phosphorodithioate) | 134 |
| 2-chlorotoluene-alpha,alpha-dithiol bis(O,O-dimethyl phosphorodithioate) | 176 |
| 2,6-dichlorotoluene-alpha,alpha - dithiol bis (O,O-dimethyl phosphorodithiate) | 40 |
| Toluene - alpha,alpha - dithiol bis(O,O - dimethyl phosphorodithioate) | 154 |
| Toluene-alpha,alpha-dithiol bis(O,O-diethyl phosphorodithioate) | 88 |

The combination of good toxicity to a broad spectrum of insects and low mammalian toxicity makes the compound of this invention attractive for commercial development. This compound can satisfy a great need of agriculture for crop protection and for the householder who requires a safe material for pest control in the home and garden. In the field of public health, this compound also is potentially useful, for it has been found that it kills mosquito larvae at low concentrations. Again the safety feature of this compound adds to its value for public health applications.

In recent years an ever-increasing number of important pests of agriculture and public health have become resistant to chlorinated hydrocarbon insecticides. The compound of this invention being of a different structure and mode of action provides an alternate control agent for such resistant insects.

The following examples are presented to illustrate the preparation of the compound of the invention and its activity as an insecticide. These examples should not be regarded as limiting the scope of the invention.

*Example I.—Preparation of 4-fluorotoluene-alpha,alpha-dithio bis(O,O-dimethyl phosphorodithioate)*

One drop of concentrated sulfuric acid was added to 10 parts of 4-fluorobenzaldehyde and 9.85 parts of acetic anhydride. The exothermic reaction was allowed to cool to room temperature. The resultant diacetate was added portionwise to 30.7 parts of O,O-dimethyl hydrogen phosphorodithioate (TA) containing one drop of concentrated sulfuric acid. The reaction mixture was heated to 80° C. allowed to cool to room temperature, diluted with ether, washed with $H_2O$ and dilute $NaHCO_3$ and dried over $MgSO_4$, filtered and then stripped. A 82.5% yield of a white solid, melting point 67–69° C., was obtained after crystallization from ether. Structure confirmed by infrared and elemental analysis.

| Analysis: | | Acid equiv., g./eq. |
|---|---|---|
| Calculated: percent/w. P, 14.7 | | 38.4 |
| Found: percent/w. P, 15.1 | | 38.7 |

*Example II*

The insecticidal and miticidal activity of 4-fluorotoluene-alpha,alpha - dithiol bis(O,O - dimethyl phosphorodithioate) was evaluated and the results are summarized below.

(a) Two-spotted spider mite (*Tetranychus telarius*): Leaves of pinto bean plants were infested with uniform numbers of mites. Paired replicates of the plants were sprayed with several concentrations of the test compound in aqueous suspension. Mortality counts of the mites were taken 24 hours later. From the mortality-concentration data, the $LC_{50}$ (concentration required to kill 50% of the mites) was determined graphically to be 0.0086%.

(b) Pea aphid (*Macrosiphum pisi*): Aphids on broad bean plants were sprayed with suspensions of the test compound at varying concentrations and the $LC_{50}$ determined to be 0.00071%, by weight, in a similar manner to that described for the two spotted spider mite.

(c) Corn earworm (*Heliothis zea*): The activity of the compound of the invention to this species was evaluated by spraying broad bean leaves with varying concentrations of the compound and placing worms of uniform size upon the treated foliage. Two days later the number of live and dead worms were counted and from these data the $LC_{50}$ was determined. Replicated tests repeated on several days revealed the average $LC_{50}$ to be 0.053% by weight.

(d) Mosquito larvae (*Anopheles albimanus*): Sufficient acetone solution of varying concentrations was pipetted with 100 milliliters of water to give the desired parts per million of the test compound in the water. Ten, fourth-instar *A. albimanus* larvae were introduced into each replicate of several concentrations. The larvae were exposed for 24 hours, then mortality counts were made. The $LC_{50}$ was determined to be 0.0097 part per million.

It is thus evident that the compound of this invention is an effective insecticide, the term "insect" including not only the members of the class Insecta, but also related or similar non-vertebrate animal organisms belonging to the allied classes of anthropods and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of a solution or dispersion, or it can be absorbed on an inert, finely-divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl acid sulfonates, long chain alkyl sulfonates, phenol ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime gypsum, pyrophyllite and similar inert solid diluents. If desired, the compounds of the present invention can be employed as an aerosol, as by dispersing the same into the atmosphere by means of a compressed gas.

The concentration of the compound to be used with the above carriers is dependent upon many factors, including the carrier employed, the method and conditions of application, and the insect species to be controlled, a proper consideration and resolution of these factors being within the skill of those versed in the insecticide art. In general, however, the compound of this invention is effective in concentrations of from about 0.01% to 0.5% based upon the total weight of the composition, though under some circumstances as little as about 0.00001% or as much as 2% or even more of the compound can be employed with good results from an insecticidal standpoint. Concentrates suitable for sale for dilution in the field may contain as much as 25–50% by weight, or even more, of the insecticide.

When employed as an insecticide, the compound of this invention can be employed either as the sole toxic ingredient of the insecticidal composition or can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead and/or fluorine.

I claim as my invention:

4-fluorotoluene-alpha,alpha-dithiol bis(O,O-dimethyl phosphorodithioate).

References Cited by the Examiner

UNITED STATES PATENTS

| | | | |
|---|---|---|---|
| 2,754,242 | 7/1956 | Kosolapoff | 167—30 |
| 2,769,743 | 11/1956 | Mattson | 167—30 |
| 3,155,707 | 11/1964 | Kaver | 260—461 |
| 3,157,686 | 11/1964 | Pohlemann et al. | 260—461 |

CHARLES B. PARKER, *Primary Examiner.*

JOSEPH P. BRUST, *Examiner.*

SHEP K. ROSE, B. BILLIAN, *Assistant Examiners.*